(12) United States Patent
Zheng et al.

(10) Patent No.: US 11,108,824 B2
(45) Date of Patent: Aug. 31, 2021

(54) WIRELESS COMMUNICATION METHOD, DEVICE AND SYSTEM, WIRELESS COMMUNICATION EQUIPMENT AND RECORDING MEDIUM

(71) Applicant: SZ DJI TECHNOLOGY CO., LTD., Shenzhen (CN)

(72) Inventors: Deen Zheng, Shenzhen (CN); Xiaojun Yin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/874,192

(22) Filed: May 14, 2020

(65) Prior Publication Data
US 2020/0280585 A1 Sep. 3, 2020

Related U.S. Application Data (63) Continuation of application No. PCT/CN2017/113301, filed on Nov. 28, 2017.

(51) Int. Cl.
*H04M 1/66* (2006.01)
*H04L 29/06* (2006.01)
*H04W 12/50* (2021.01)
*H04W 12/63* (2021.01)

(52) U.S. Cl.
CPC .............. *H04L 63/18* (2013.01); *H04L 63/08* (2013.01); *H04L 63/105* (2013.01); *H04W 12/50* (2021.01); *H04W 12/63* (2021.01)

(58) Field of Classification Search
CPC ..... H04W 12/06; H04W 84/12; H04W 28/18; H04W 48/08; H04W 60/00; H04W 88/02; H04M 2250/02
See application file for complete search history.

(56) References Cited

FOREIGN PATENT DOCUMENTS

| CN | 101142790 A | 3/2008 |
| CN | 101523959 A | 9/2009 |
| CN | 101754214 A | 6/2010 |

(Continued)

OTHER PUBLICATIONS

The World Intellectual Property Organization (WIPO) International Search Report for PCT/CN2017/113301 dated Mar. 28, 2018 6 pages.

*Primary Examiner* — Gary Lafontant
(74) *Attorney, Agent, or Firm* — Anova Law Group, PLLC (57) ABSTRACT

A wireless communication method includes performing authentication information exchange, performing network fusion, and performing network fusion secure communication. Performing authentication information exchange includes establishing a first secure communication in a first wireless network between a first apparatus and a second apparatus and exchanging authentication information between the first apparatus and the second apparatus. Performing network fusion includes switching from the first wireless network to a second wireless network different from the first wireless network. Performing network fusion secure communication includes establishing a second secure communication in the second wireless network between the first apparatus and the second apparatus using the authentication information exchanged during the authentication information exchange through the first secure communication.

14 Claims, 4 Drawing Sheets (56) References Cited

FOREIGN PATENT DOCUMENTS

| | | | |
|---|---|---|---|
| CN | 103139768 A | 6/2013 | |
| CN | 105635935 A | 6/2016 | |
| CN | 107079365 A | 8/2017 | |
| CN | 109756447 A * | 5/2019 | |
| EP | 1233570 A1 | 8/2002 | |
| WO | WO-03055261 A1 * | 7/2003 | ........ H04W 36/0038 |
| WO | 2017124988 A1 | 7/2017 | |

* cited by examiner

WIRELESS COMMUNICATION METHOD, DEVICE AND SYSTEM, WIRELESS COMMUNICATION EQUIPMENT AND RECORDING MEDIUM

CROSS-REFERENCE TO RELATED APPLICATION

This application is a continuation of International Application No. PCT/CN2017/113301, filed Nov. 28, 2017, the entire content of which is incorporated herein by reference.

TECHNICAL FIELD

The present disclosure relates to a wireless communication method, a device, and system, wireless communication equipment, and a recording medium and, more particularly, to a secure communication method, device, and system, wireless communication equipment, or a recording medium for wireless network fusion.

BACKGROUND

With a rapid development of the wireless network communication technology, wireless communication device uses wireless network fusion technologies that combine public wireless networks with private wireless networks, or combine short-range wireless networks and remote wireless networks, to achieve the fusion of a plurality of wireless communication networks. Such technologies are implemented to ensure a wireless communication quality, expand a wireless communication range, and improve a reliability of wireless communications, etc.

However, in the case of the plurality of wireless communication networks, each wireless communication network generally needs to perform a security authentication of, e.g., apparatus ID, user ID, password, etc., to ensure secure communication to avoid illegal access. Thus, when the communication network switches from a wireless communication network to another wireless communication network, the security authentication generally needs to be performed again. As such, it is cumbersome for users who use wireless communication apparatuses with wireless network fusion technology, and the user experience deteriorates. For example, between communication apparatuses that have successfully authenticated each other through Bluetooth communication, once the communication network is switched from Bluetooth communication to, e.g., WiFi communication, the communication apparatuses that have successfully authenticated each other need to be re-authenticated.

In particular, for example, in the field of unmanned aerial vehicle (UAV) that have boomed in recent years, public wireless networks, such as 4G communications and even 5G in the future, are being gradually used in UAV communications. The security authentication, e.g., pairing, etc., between the UAVs or between the UAV and a remote controller that controls the UAV is often completed in a private wireless network such as WiFi, SDR, or Lightbridge. In this way, users may think that the secure communication is achieved after the UAV is paired with the UAV or the remote controller for one time, without considering the existence of several wireless communication environments, i.e., the existence of several wireless communication systems, between the UAVs or between the UAV and the remote controller.

How to solve the redundant authentication in the wireless network fusion technology to improve the communication efficiency using wireless network fusion technology, improve user convenience, and improve user experience becomes an urgent technical problem in the field.

SUMMARY

Embodiments of the present disclosure provide a wireless communication method including performing authentication information exchange, performing network fusion, and performing network fusion secure communication. Performing authentication information exchange includes establishing a first secure communication in a first wireless network between a first apparatus and a second apparatus and exchanging authentication information between the first apparatus and the second apparatus. Performing network fusion includes switching from the first wireless network to a second wireless network different from the first wireless network. Performing network fusion secure communication includes establishing a second secure communication in the second wireless network between the first apparatus and the second apparatus using the authentication information exchanged during the authentication information exchange through the first secure communication.

DETAILED DESCRIPTION OF THE EMBODIMENTS

The embodiments of the disclosure are described with reference to the drawings.

Figure 1:
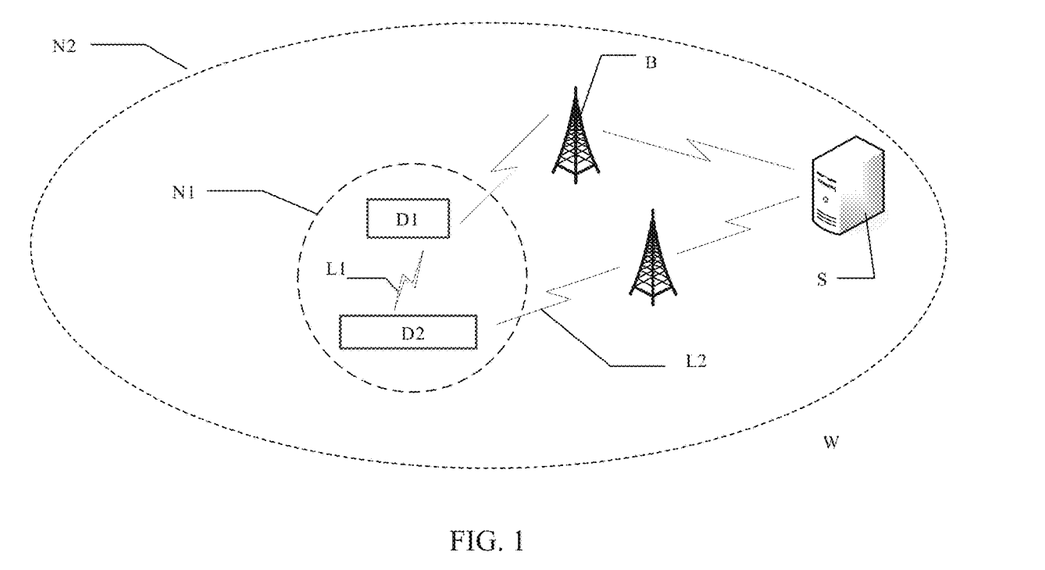
FIG. 1 is a schematic structural diagram of a wireless communication system consistent with embodiments of the disclosure.

FIG. 1 is a schematic structural diagram of a wireless communication system W consistent with embodiments of the disclosure.

As shown in FIG. 1, the wireless communication system W includes at least a first electronic apparatus D1, a second electronic apparatus D2, a first wireless network N1, and a second wireless network N2 different from the first wireless network.

In some embodiments, both the first electronic apparatus D1 and the second electronic apparatus D2 can perform wireless communication with each other through at least two different wireless networks. For example, the first electronic apparatus D1 and the second electronic apparatus D2 may perform wireless communication with each other through the first wireless network N1 or the second wireless network N2. In some embodiments, the first electronic apparatus D1 and the second electronic apparatus D2 may choose whether to communicate with each other through the first wireless network N1 or the second wireless network N2 according to specific communication conditions.

For example, the first electronic apparatus D1 may be a speaker capable of performing Bluetooth communication, WiFi communication, 2G\3G\4G\5G communication, etc. The second electronic apparatus D2 may be a cell phone capable of performing communication with the first electronic apparatus D1 through Bluetooth communication, WiFi communication, 2G \ 3G\4G\5G communication, etc. As another example, the first electronic apparatus D1 may be an unmanned aerial vehicle (UAV) capable of performing WiFi communication, SDR communication, 2G\3G\4G\5G communication, etc., and the second electronic apparatus D2 may be a UAV remote controller capable of performing communication with the first electronic apparatus D1 through WiFi communication, SDR communication, 2G\3G\4G\5G communication, etc. In another example, the first electronic apparatus D1 and the second electronic apparatus D2 may both be UAVs capable of performing WiFi communication, SDR communication, 2G\3G\4G\5G communication, etc.

In some embodiments, the first wireless network N1 may be a short-range wireless communication network such as Bluetooth, Near-field communication (NFC), ZigBee, etc. On the other hand, the second wireless network N2 may be a long-distance wireless communication network, such as LoRa, etc. with a communication distance greater than that of the first wireless network N1. In some embodiments, the first wireless network N1 may be a private wireless communication network such as WiFi, SDR, Lightbridge, etc., while the second wireless network N2 may be a public wireless communication network such as 2G\3G\4G\5G, etc. The first wireless network N1 and the second wireless network N2 can be wireless communication networks with different communication protocols. For example, the protocol of a communication link L1 of the first wireless network N1 and the protocol of a communication link L2 of the second wireless network N2 are different, but the communication distance, range, type, etc. are not limited.

In some embodiments, as shown in FIG. 1, the second wireless network N2, which can be a long-distance wireless communication network or a public wireless communication network, generally includes a network server S for information processing and management in a network environment, a base station B which can be a radio transceiver, etc.

The configurations will be described with reference to FIG. 2 for the first electronic apparatus D1 and the second electronic apparatus D2 that are capable of wireless communication with each other.

Figure 2:
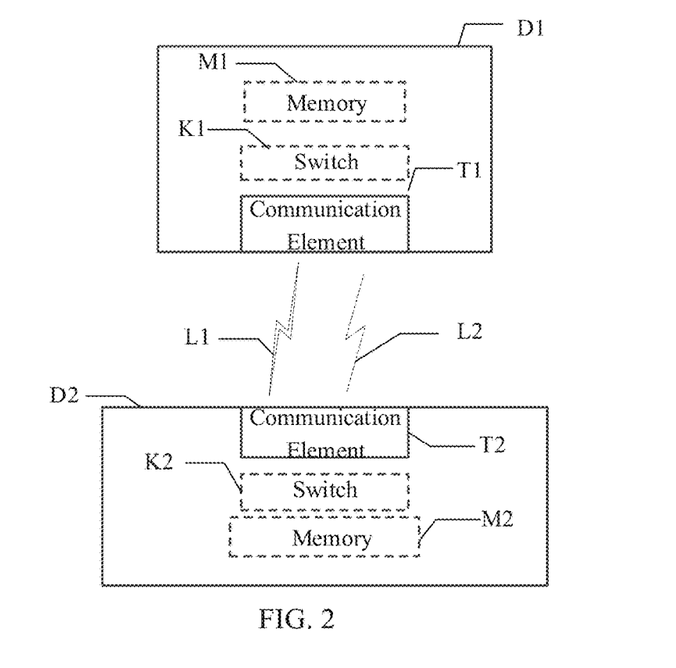
FIG. 2 is a schematic structural diagram of wireless communication apparatuses consistent with embodiments of the disclosure.

FIG. 2 is a schematic structural diagram of wireless communication apparatuses consistent with embodiments of the disclosure.

As shown in FIG. 2, the first electronic apparatus D1 and the second electronic apparatus D2 generally include communication circuits T1 and T2, respectively, for wireless communication. Both the first electronic apparatus D1 and the second electronic apparatus D2 can perform wireless communication with each other through at least two different wireless networks. For example, both the first electronic apparatus D1 and the second electronic apparatus D2 may perform wireless communication with each other through the first wireless network N1 or the second wireless network N2.

In addition, the first electronic apparatus D1 and the second electronic apparatus D2 may choose whether to communicate with each other through the first wireless network N1 or the second wireless network N2 according to specific communication conditions. As shown in FIG. 2, the first electronic apparatus D1 and the second electronic apparatus D2 may include switches K1 and K2, respectively. The switches K1 and K2 may switch according to specific communication conditions to allow the first electronic apparatus D1 and the second electronic apparatus D2 to communicate with each other through the first wireless network N1 or the second wireless network N2. In FIG. 2, the switches K1 and K2 are depicted with dashed lines, indicating that they may or may not be provided in different embodiments.

In some embodiments, the first electronic apparatus D1 and the second electronic apparatus D2 may also include memories M1 and M2 for storing information. As shown in FIG. 2, the memories M1 and M2 are depicted with dashed lines, indicating that they may or may not be provided in different embodiments.

The wireless communication method consistent with the present disclosure will be described in detail below with reference to FIGS. 3-6 in combination with FIGS. 1 and 2. The wireless communication method can be implemented, e.g., in the first electronic apparatus D1 and the second electronic apparatus D2 of the wireless communication system W for network fusion communication with each other.

Figure 3:
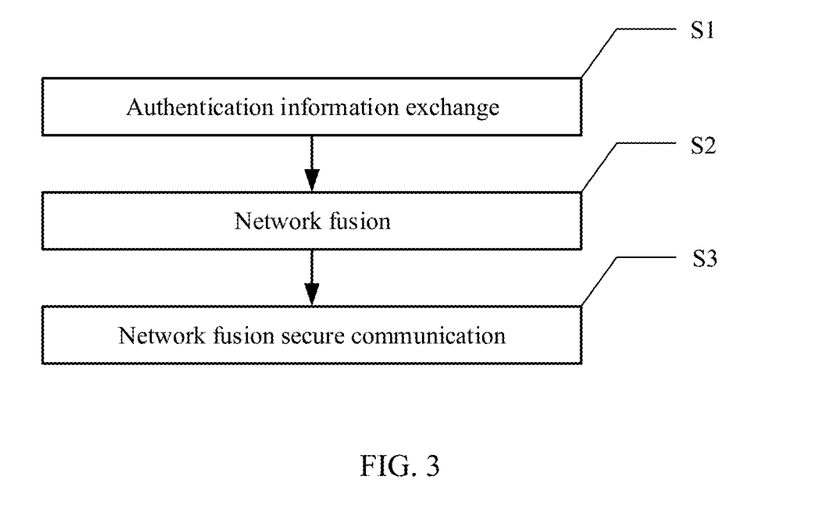
FIG. 3 is a flowchart of a wireless communication method consistent with embodiments of the disclosure.

FIG. 3 is a flowchart of a wireless communication method consistent with embodiments of the disclosure.

As shown in FIG. 3, the wireless communication method includes an authentication information exchange (S1), a network fusion (S2), and a network fusion secure communication (S3).

In the authentication information exchange process at S1, the first electronic apparatus D1 and the second electronic apparatus D2 establish a secure communication via the first wireless network N1 and exchange authentication information with each other.

In some embodiments, for each of the first electronic apparatus D1 and the second electronic apparatus D2 capable of performing wireless communication with each other, generally, the authentication information, such as an apparatus ID, an initial password, an identification ID, etc., can be set at the factory to uniquely characterize the apparatus itself. In this way, after the first electronic apparatus D1 and the second electronic apparatus D2 authenticate each other for the first time, e.g., through a frequency pairing function, and successfully communicate with each other through the first wireless network N1, the first electronic apparatus D1 and the second electronic apparatus D2 exchange the authentication information by notifying each other of the authentication information (e.g., apparatus ID, initial password, identification ID, etc.).

In the network fusion process at S2, the communication environment for the first electronic apparatus D1 and the second electronic apparatus D2 is switched from the first wireless network N1 to the second wireless network N2, which is different from the first wireless network.

A condition (or opportunity) for performing the switch can include that an error such as packet loss or error code occurs to communication data between the first electronic apparatus D1 and the second electronic apparatus D2, or that the first electronic apparatus D1 and the second electronic apparatus D2 are not able to connect to each other. In this way, communication fault tolerance can be achieved through another wireless network, and the capability of the communication fault tolerance is improved.

In some embodiments, the communication distance of the link L2 of the second wireless network N2 is greater than the communication distance of the link L1 of the first wireless network N1. In this scenario, the switching condition can include that the communication distance of the first electronic apparatus D1 and the second electronic apparatus D2 exceeds the communication distance of the link L1 of the first wireless network N1.

For example, in general, private wireless networks (e.g., SDR, LightingBridge, WiFi, etc.) are suitable for communications with a low interference (e.g., wide open field, etc.) and a communication distance that is usually within 5 KM, while public wireless networks (e.g., 2G/3G/4G/5G, etc.) are suitable for long-distance communications with a lot of interference (e.g., urban environment, etc.) and free of distance restrictions. Thus, in the scenario where the first wireless network N1 is a private wireless network and the second wireless network N2 is a public wireless network, when the communication distance between the first electronic apparatus D1 and the second electronic apparatus D2 exceeds 5 KM, the communication switches from the first wireless network N1 which is a private wireless network to the second wireless network N2 which is a public wireless network.

In some embodiments, for example, a short-range communication such as Bluetooth communication generally has a communication distance within 3 meters, while communication distance for, e.g., WiFi, etc., can generally reach more than 100 meters. Thus, in the scenario where the first wireless network N1 is a Bluetooth communication and the second wireless network N2 is a WiFi communication network, when the communication distance between the first electronic apparatus D1 and the second electronic apparatus D2 exceeds 3 meters, the communication switches from the first wireless network N1 which is a Bluetooth communication to the second wireless network N2 which is a WiFi communication network.

As such, the communication distance is extended. Especially in the field of UAV, long-distance remote-control and long-distance communication between UAVs can be achieved.

In some embodiments, the network switching condition may be contrary to that described above, e.g., the switching may be performed when the network communication distance changes from a long distance to a short distance (e.g., within 3 meters, etc.). In some embodiments, a timer may be set for switching, and the switches K1 and K2 shown in FIG. 2 are configured to switch the network at set times. The first wireless network N1 and the second wireless network N2 can be wireless communication networks with different communication protocols.

In some embodiments, in the network fusion secure communication process at S3, in the second wireless network N2, the first electronic apparatus D1 and the second electronic apparatus D2 directly use the authentication information (for example, apparatus ID, initial password, identification ID, etc.) exchanged with each other in the authentication information exchange process at S1 to establish secure communication without performing the authentication with each other again.

In the present disclosure, the technical problem of redundant authentication in the current wireless network fusion technology is solved, an efficiency of communication using wireless network fusion technology is improved, and the user convenience and user experience are improved.

In some embodiments, when both the first electronic apparatus D1 and the second electronic apparatus D2 are provided with the memories M1 and M2 shown in FIG. 2, in the authentication information exchange process at S1, the exchanged authentication information is stored in the memories M1 and M2, respectively. The authentication information can be stored in the respective memories, and the authentication information will not be lost due to shut down or power failure.

In the network fusion process at S2, the wireless communication may be switched from the first wireless network N1 to the second wireless network N2 in the situation when the first electronic apparatus D1 and/or the second electronic apparatus D2 is turned off then turned on. In the situation when the communication distance of the link L2 of the second wireless network N2 is greater than the communication distance of L1 of the first wireless network N1, the wireless communication can be switched from the first wireless network N1 to the second wireless network N2 when the first electronic apparatus D1 and/or the second electronic apparatus D2 is turned off then turned on and the communication distance between the first electronic apparatus D1 and the second electronic apparatus D2 exceeds the communication distance of the link L1 of the first wireless network N1.

In the network fusion secure communication process at S3, in the second wireless network N2, the first electronic apparatus D1 and the second electronic apparatus D2 continue to use the exchanged authentication information stored in the memories M1 and M2 to establish the secure communication.

Therefore, in the disclosure, not only the technical problem of the redundant authentication in the current wireless network fusion technology is solved, but also the problem of losing the authentication information due to shut off or power failure is solved, so that the efficiency of the communication using the wireless network fusion technology is improved, the user convenience is improved, and the user experience is improved.

Figure 4:
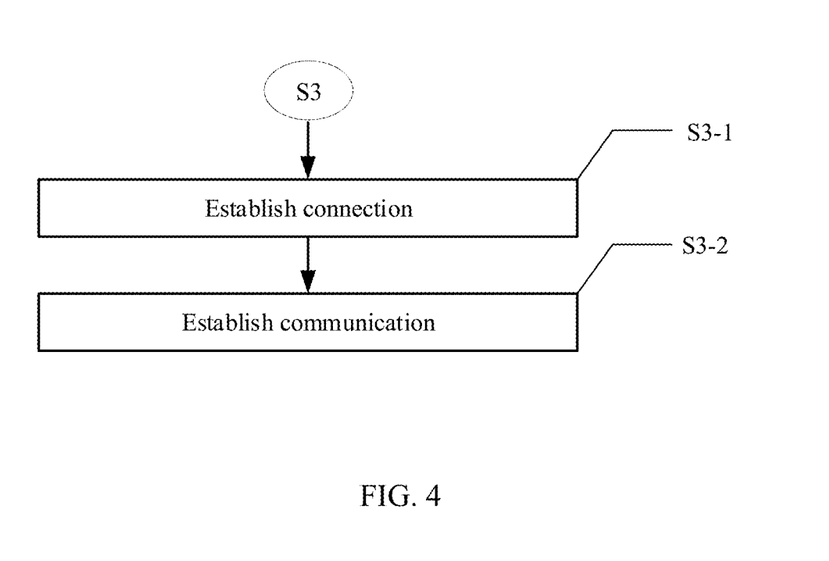
FIG. 4 is a flowchart showing the network fusion secure communication process of the wireless communication method consistent with embodiments of the disclosure.
Figure 5:
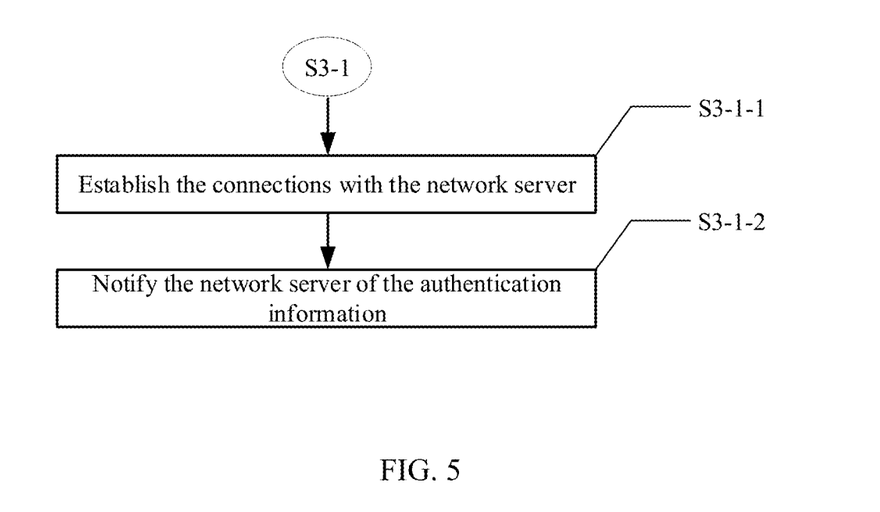
FIG. 5 is a flowchart showing the connection establishing processes of the network fusion secure communication process of the wireless communication method consistent with embodiments of the disclosure.
Figure 6:
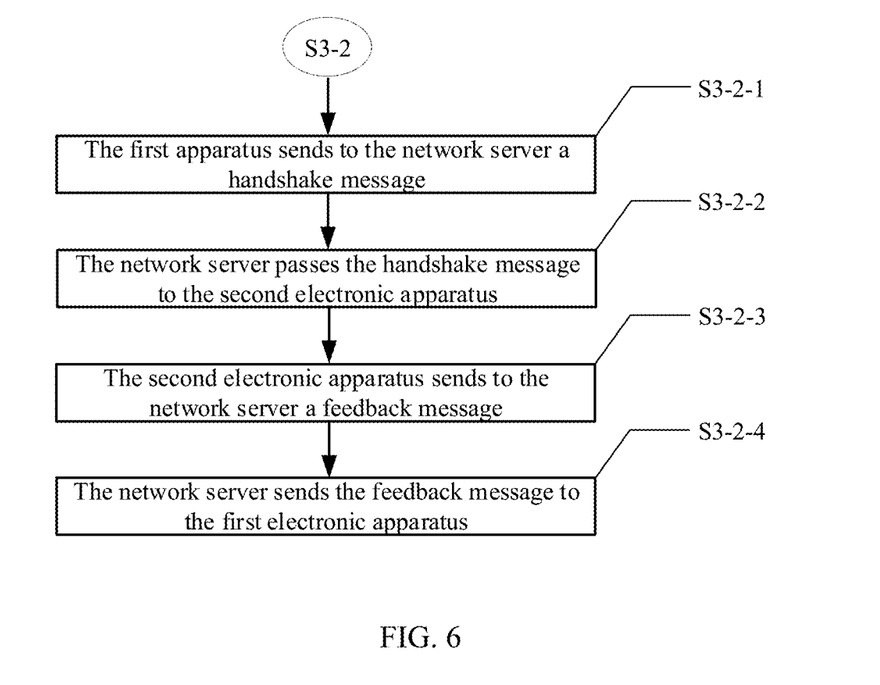
FIG. 6 is a flowchart showing the communication establishing process of the network fusion secure communication process of the wireless communication method consistent with embodiments of the disclosure.

With reference to FIG. 4 to FIG. 6, the network fusion secure communication processes are specifically described as follows.

FIG. 4 is a flowchart showing the network fusion secure communication process of the wireless communication method consistent with embodiments of the disclosure.

As shown in FIG. 4, the network fusion secure communication process at S3 includes a process to establish connection (S3-1) and a process to establish communication (S3-2).

In the process to establish connection at S3-1, the first electronic apparatus D1 and the second electronic apparatus D2 respectively establish connections with the network server S in the second network N2 shown in FIG. 1, and notify the network server S of the authentication information (e.g., apparatus ID, initial password, identification ID, etc.), which is exchanged in the authentication information exchange process at S1.

In the process to establish communication at S3-2, the secure communication between the first electronic apparatus D1 and the second electronic apparatus D2 is established using the authentication information (e.g., apparatus ID, initial password, identification ID, etc.), which is exchanged in the authentication information exchange process at S1, through the network server S.

The network fusion secure communication process is described in detail below with reference to FIG. 5 and FIG. 6.

FIG. 5 is a flowchart showing the connection establishing process of the network fusion secure communication process of the wireless communication method consistent with embodiments of the disclosure.

As shown in FIG. 5, in the process to establish connection at S3-1, the first electronic apparatus D1 and the second electronic apparatus D2 establish the connections with the network server S in the second network N2 (S3-1-1). In some embodiments, for example, the first electronic apparatus D1 (e.g., the UAV) establishes the connection with the network server S. In some embodiments, the first electronic apparatus D1 establishes an encrypted environment of an encrypted connection with the network server S using a unique key of the first electronic apparatus D1 set by the factory. Similarly, the second electronic apparatus D2 (e.g., a UAV remote controller) establishes the connection with the network server S. In some embodiments, the second electronic apparatus D2 establishes an encrypted environment of an encrypted connection with the network server S using a unique key of the second electronic apparatus D2 set by the factory.

The authentication information (e.g., apparatus ID, etc.), which is exchanged in the authentication information exchange process at S1, is communicated to the network server S (S3-1-2). In some embodiments, for example, the first electronic apparatus D1 (e.g., the UAV) notifies the network server S of the authentication information (e.g., the apparatus ID of the second electronic apparatus), which is exchanged in the authentication information exchange process at S1, through the connection established in the process at S3-1-1, i.e., notify the network server S of the apparatus ID of the target apparatus that can access (i.e., communicate with) the first electronic apparatus D1. Similarly, the second electronic apparatus D2 (e.g., a UAV remote controller) notifies the network server S of the authentication information (e.g., the apparatus ID of the first electronic apparatus), which is exchanged in the authentication information exchange process at S1, through the connection established in the process at S3-1-1, i.e., notify the network server S of the apparatus ID of the target apparatus that can access (i.e., communication with) the second electronic apparatus D2 (S3-1-2).

FIG. 6 is a flowchart showing the communication establishing process of the network fusion secure communication process of the wireless communication method consistent with embodiments of the disclosure.

As shown in FIG. 6, in the process to establish a communication at S3-2, through the connection established in the process to establish a connection at S3-1, the first electronic apparatus D1 (e.g., a UAV) sends to the network server S a handshake message used for performing handshake with the second electronic apparatus D2 (e.g., a UAV remote controller) (S3-2-1). The handshake message may include the apparatus ID of the first electronic apparatus D1 (e.g., a UAV) and the apparatus ID of the second electronic apparatus D2 (e.g., a UAV remote controller as a target).

The network server S passes the handshake message to the second electronic apparatus D2 (e.g., a UAV remote controller as the handshake target) according to the authentication information (e.g., apparatus ID) (S3-2-2). In some embodiments, the network server S determines the correct second electronic apparatus D2 as the handshake target (e.g., a UAV remote controller as the handshake target) according to the combination of the authentication information (e.g., apparatus ID) and the apparatus ID of the second electronic apparatus D2 (e.g., a UAV remote controller as a handshake target), so that the handshake information can be passed to the correct second electronic apparatus D2.

The second electronic apparatus D2 (e.g., a UAV remote controller) sends to the network server S a feedback message configured to provide feedback to the first electronic apparatus D1 (e.g., a UAV as a feedback target) (S3-2-3). The feedback message may include the apparatus ID of the second electronic apparatus D2 (e.g., a UAV remote controller) and the apparatus ID of the first electronic apparatus D1 (e.g., a UAV as a feedback target).

The network server S sends the feedback message to the first electronic apparatus D1 (e.g., a UAV as a feedback target) according to the authentication information (S3-2-4). In some embodiments, the network server S determines the correct first electronic apparatus D1 (e.g., a UAV as a feedback target) as the feedback target according to the combination of the authentication information (e.g., apparatus ID) and the apparatus ID of the first electronic apparatus D1 (e.g., a UAV as a feedback target), so that the feedback message is sent to the correct first electronic apparatus D1. As such, the communication between the first electronic apparatus D1 (e.g., a UAV) and the second electronic apparatus D2 (e.g., a UAV remote controller) is established.

In the embodiments of the disclosure, according to the described wireless communication method, the wireless communication system, etc., the technical problem of the redundant authentication of the current wireless network fusion technology is solved, so that the efficiency of the communication using the wireless network fusion technology is improved, the user convenience is improved, and the user experience is improved.

Figure 7:
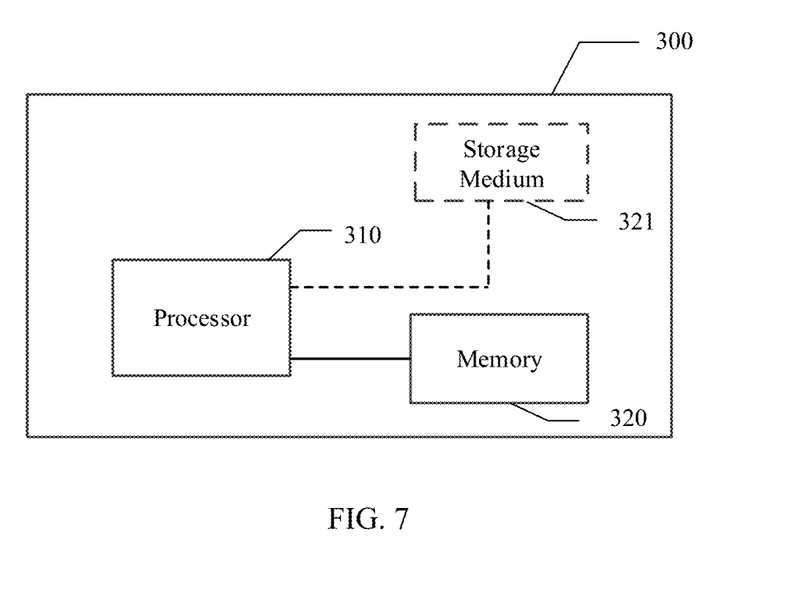
FIG. 7 is a schematic structural diagram of a wireless communication device consistent with embodiments of the disclosure.

The hardware structure of a wireless communication device for implementing the wireless communication method is described below with reference to FIG. 7. FIG. 7 is a structural diagram of a wireless communication device consistent with embodiments of the disclosure.

As shown in FIG. 7, the wireless communication device 300 includes a processor 310 (e.g., CPU, etc.), a memory 320 (e.g., a hard drive HDD, a read-only memory ROM, etc.). The wireless communication device 300 may also include a readable storage medium 321 (e.g., disc, CD-ROM, USB, etc.), which is depicted using dashed lines.

FIG. 7 is merely an example embodiment, which does not limit the technical solution of the disclosure. Each part in the wireless communication device 300 may be one or more, e.g., the processor 310 may include one processor or a plurality of processors.

In the embodiments of the disclosure, the above described processes of the wireless communication method with reference to the flowcharts (FIG. 3-FIG. 6) may be implemented by a computer software program. The computer software program may include one program or a plurality of programs.

For example, the computer software program is stored in the memory 320 which is a storage device of the wireless communication device 300. By executing the computer software program, the one or more processors 310 of the wireless communication device 300 execute the wireless communication method shown in the flowcharts of FIG. 3 to FIG. 6 in the disclosure, or the variation thereof.

The technical problem of the redundant authentication in the current wireless network fusion technology can also be solved by the wireless communication device, so that the efficiency of the communication using the wireless network fusion technology is improved, the user convenience is improved, and the user experience is improved.

The wireless communication method may also be implemented as a computer program and be stored in the computer-readable storage medium (e.g., as shown in FIG. 7, a computer-readable storage medium 321), and the computer program may include codes/computer executable instructions, which allow the computer to execute the wireless communication method shown in the flowcharts of FIG. 3-FIG. 6 in the disclosure, or the variation thereof.

The computer-readable medium, for example may be any medium that can contain, store, transfer, propagate, or transmit instructions. For example, the readable storage medium may include but not limit to electronic, magnetic, optical, electro-magnetic, infrared or semiconductor systems, devices, components or transmission media. The examples for the readable storage medium include magnetic storage devices such as magnetic tapes or hard drives (HDD), optical storage devices such as disks (CD-ROM), memories such as random-access memory (RAM) or flash memory, and/or wired/wireless communication links.

The computer program may be configured with computer program codes including, for example, a computer program unit. The division method or number of the units are not fixed, and those skilled in the art may use appropriate program units or program unit combinations according to actual situations. When the combinations of the program unit are executed by a computer (or processor), the computer is made to execute the processes of the wireless communication method described in connection with FIG. 3 to FIG. 6 and the variation thereof.

Those of ordinary skilled in the art can understand that, the features described in the various embodiments and/or claims of the present disclosure may be combined in various manners, even if such a combination is not explicitly described in the present disclosure. Without departing from the spirit and instructions of the present disclosure, the features described in each embodiment and/or claim can be combined in various manners. All of the combinations are within the scope of the disclosure.

Although the present disclosure has been shown and described with reference to specific exemplary embodiments, those skilled in the art should understand that without departing from the spirit and scope of the present disclosure defined by the appended claims and their equivalents, various changes in form or detail can be made to the present disclosure. Therefore, the scope of the invention should not be limited to the described embodiments, but should be determined not only by the appended claims, but also by the equivalents of the appended claims.

What is claimed is:

1. A wireless communication method comprising:
   performing authentication information exchange, including establishing a first secure communication in a first wireless network between a first apparatus and a second apparatus and exchanging authentication information between the first apparatus and the second apparatus;
   performing network fusion, including switching from the first wireless network to a second wireless network different from the first wireless network; and
   performing network fusion secure communication, including establishing a second secure communication in the second wireless network between the first apparatus and the second apparatus using the authentication information exchanged during the authentication information exchange through the first secure communication.

2. The wireless communication method of claim 1, wherein establishing the first secure communication includes establishing the first secure communication via frequency paring between the first apparatus and the second apparatus.

3. The wireless communication method of claim 1, wherein switching from the first wireless network to the second wireless network includes switching from the first wireless network to the second wireless network in response to communication data of the first apparatus and the second apparatus in the first wireless network being incorrect or the first apparatus and the second apparatus losing connection.

4. The wireless communication method of claim 1, wherein a link communication distance of the second wireless network is greater than a link communication distance of the first wireless network.

5. The wireless communication method of claim 4, wherein switching from the first wireless network to the second wireless network includes switching from the first wireless network to the second wireless network in response to a communication distance between the first apparatus and the second apparatus exceeding the link communication distance of the first wireless network.

6. The wireless communication method of claim 4, wherein:
   performing authentication information exchange further includes storing the exchanged authentication information in memories of the first apparatus and the second apparatus;
   switching from the first wireless network to the second wireless network includes switching from the first wireless network to the second wireless network in response to at least one of the first apparatus or the second apparatus turning off and then turning on; and
   establishing the second secure communication in the second wireless network includes establishing the second secure communication in the second wireless network using the authentication information stored in the memories of the first apparatus and the second apparatus.

7. The wireless communication method of claim 6, wherein switching from the first wireless network to the second wireless network includes switching from the first wireless network to the second wireless network in response to:
   at least one of the first apparatus or the second apparatus turning off and then turning on; and
   a communication distance between the first apparatus and the second apparatus exceeding the link communication distance of the first wireless network.

8. The wireless communication method of claim 1, wherein performing network fusion secure communication includes:
   performing connection establishment, including establishing a first connection between the first apparatus and a network server in the second network and a second connection between the second apparatus and the network server, and notifying the network server of the exchanged authentication information; and
   performing communication establishment, including establishing the second secure communication between the first apparatus and the second apparatus using the authentication information through the network server.

9. The wireless communication method of claim 8, wherein:

establishing the first connection includes establishing the first connection with the network server using a unique key of the first apparatus; and establishing the second connection includes establishing the second connection with the network server using a unique key of the second apparatus.

10. The wireless communication method of claim 8, wherein performing communication establishment further includes:

sending, by the first apparatus, a handshake message to the network server;

passing, by the network server, the handshake message to the second apparatus according to the authentication information;

sending, by the second apparatus, a feedback message to the network server; and passing, by the network server, the feedback message to the first apparatus according to the authentication information.

11. The wireless communication method of claim 1, wherein the authentication information includes at least one of an apparatus ID of the first apparatus or an apparatus ID of the second apparatus.

12. The wireless communication method of claim 1, wherein:

the first wireless network includes a private wireless network; and the second wireless network includes a public wireless network.

13. The wireless communication method of claim 1, wherein:

the first apparatus includes one of an unmanned aerial vehicle (UAV) and a remote controller configured to control the UAV; and the second apparatus includes the other one of the UAV and the remote controller.

14. The wireless communication method of claim 1, wherein:

the first apparatus includes a first unmanned aerial vehicle (UAV); and the second apparatus includes a second UAV.

* * * * *